US007950584B2

(12) United States Patent
Simske et al.

(10) Patent No.: US 7,950,584 B2
(45) Date of Patent: May 31, 2011

(54) PACKAGE SECURITY HAVING A STATIC ELEMENT AND A DYNAMIC ELEMENT

(75) Inventors: Steven J. Simske, Fort Collins, CO (US); Philip Keenan, Letchworth (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 755 days.

(21) Appl. No.: 11/554,945

(22) Filed: Oct. 31, 2006

(65) Prior Publication Data

US 2008/0099565 A1 May 1, 2008

(51) Int. Cl.
*G06K 19/06* (2006.01)

(52) U.S. Cl. .......... 235/491

(58) Field of Classification Search .......... 235/487, 235/488, 491, 492, 494; 283/71, 72, 74, 283/81, 83–85, 92, 94; 428/29, 915–917; 229/102; 383/5
See application file for complete search history.

(56) References Cited

U.S. PATENT DOCUMENTS

| | | | | |
|---|---|---|---|---|
| 5,605,738 | A * | 2/1997 | McGinness et al. | 428/195.1 |
| 5,851,615 | A * | 12/1998 | Kay | 428/40.1 |
| 5,912,759 | A * | 6/1999 | Good et al. | 359/297 |
| 6,010,771 | A | 1/2000 | Isen et al. | |
| 6,085,903 | A * | 7/2000 | Jotcham et al. | 206/459.5 |
| 6,217,966 | B1 * | 4/2001 | Finster et al. | 428/42.1 |
| 6,530,527 | B1 | 3/2003 | Ahlers et al. | |
| 6,637,906 | B2 | 10/2003 | Knoerzer et al. | |
| 6,659,507 | B2 * | 12/2003 | Banahan | 283/81 |
| 6,869,015 | B2 * | 3/2005 | Cummings et al. | 235/462.25 |
| 7,108,183 | B1 * | 9/2006 | Cox, Jr. | 235/462.01 |
| 7,233,250 | B2 * | 6/2007 | Forster | 340/572.8 |
| 7,242,301 | B2 * | 7/2007 | August et al. | 340/572.1 |
| 7,353,994 | B2 * | 4/2008 | Farrall et al. | 235/454 |
| 7,487,037 | B2 * | 2/2009 | Schmidtberg | 701/201 |
| 7,584,888 | B2 * | 9/2009 | Stephenson et al. | 235/383 |
| 2002/0170966 | A1 | 11/2002 | Hannigan | |
| 2005/0116048 | A1 | 6/2005 | Sauter et al. | |
| 2005/0234785 | A1 * | 10/2005 | Burman et al. | 705/28 |
| 2005/0237203 | A1 * | 10/2005 | Burman et al. | 340/572.8 |
| 2005/0243305 | A1 * | 11/2005 | Vig et al. | 356/71 |
| 2006/0169787 | A1 * | 8/2006 | Gelbman | 235/492 |

FOREIGN PATENT DOCUMENTS

| | | | |
|---|---|---|---|
| GB | 2258426 | | 2/1993 |
| WO | WO9908881 | | 2/1999 |
| WO | WO 0036560 | A1 * | 6/2000 |
| WO | WO2004110892 | | 12/2004 |
| WO | WO2005027036 | A1 | 3/2005 |
| WO | WO2005115766 | | 12/2005 |

* cited by examiner

*Primary Examiner* — Michael G Lee
*Assistant Examiner* — Suezu Ellis

(57) ABSTRACT

A package security feature is provided, the package security feature having a static element and a dynamic element. The dynamic element selectively interacts with the static element to enable identification and anti-tampering for a package.

22 Claims, 8 Drawing Sheets

300A

| | | | | | | | | | |
|---|---|---|---|---|---|---|---|---|---|
| C1 | C3 | C1 | C3 | C1 | C3 | C1 | C3 | C1 | C3 |
| C2 | C4 | C2 | C4 | C2 | C4 | C2 | C4 | C2 | C4 |
| C1 | C3 | C1 | C3 | C1 | C3 | C1 | C3 | C1 | C3 |
| C2 | C4 | C2 | C4 | C2 | C4 | C2 | C4 | C2 | C4 |
| C1 | C3 | C1 | C3 | C1 | C3 | C1 | C3 | C1 | C3 |
| C2 | C4 | C2 | C4 | C2 | C4 | C2 | C4 | C2 | C4 |
| C1 | C3 | C1 | C3 | C1 | C3 | C1 | C3 | C1 | C3 |
| C2 | C4 | C2 | C4 | C2 | C4 | C2 | C4 | C2 | C4 |
| C1 | C3 | C1 | C3 | C1 | C3 | C1 | C3 | C1 | C3 |
| C2 | C4 | C2 | C4 | C2 | C4 | C2 | C4 | C2 | C4 |

FIGURE 3A

300B

| | | | | | | | |
|---|---|---|---|---|---|---|---|
| C1 | C2 | C3 | C4 | C1 | C2 | C3 | C4 |
| C1 | C2 | C3 | C4 | C1 | C2 | C3 | C4 |
| C1 | C2 | C3 | C4 | C1 | C2 | C3 | C4 |
| C1 | C2 | C3 | C4 | C1 | C2 | C3 | C4 |
| C1 | C2 | C3 | C4 | C1 | C2 | C3 | C4 |
| C1 | C2 | C3 | C4 | C1 | C2 | C3 | C4 |
| C1 | C2 | C3 | C4 | C1 | C2 | C3 | C4 |
| C1 | C2 | C3 | C4 | C1 | C2 | C3 | C4 |
| C1 | C2 | C3 | C4 | C1 | C2 | C3 | C4 |
| C1 | C2 | C3 | C4 | C1 | C2 | C3 | C4 |

FIGURE 3B

400

| | | | | | | | | | |
|---|---|---|---|---|---|---|---|---|---|
| | X | | X | X | | | | X | X |
| X | X | | X | X | | X | X | | X |
| | | | X | X | X | | X | | X |
| X | | | X | | | | X | X | X |
| | X | X | | | X | X | | X | |
| X | | X | | X | X | | X | X | X |
| | X | X | X | | X | | X | X | |
| | X | | X | | | X | | | X |
| | | X | | X | X | X | X | | X |
| X | X | X | X | | X | | X | | X |

FIGURE 4

| | | | | | | | | | |
|---|---|---|---|---|---|---|---|---|---|
| C1 | X | C1 | X | X | C3 | C1 | C3 | X | X |
| X | X | C2 | X | X | C4 | X | X | C2 | X |
| C1 | C3 | C1 | X | X | X | C1 | X | C1 | X |
| X | C4 | C2 | X | C2 | C4 | C2 | X | X | X |
| C1 | X | X | C3 | C1 | X | X | C3 | X | C3 |
| X | C4 | X | C4 | X | X | C2 | X | X | X |
| C1 | X | X | X | C1 | X | C1 | X | X | C3 |
| C2 | X | C2 | X | C2 | C4 | X | C4 | C2 | X |
| C1 | C3 | X | C3 | X | X | X | X | C1 | X |
| X | X | X | X | C2 | X | C2 | X | C2 | X |

PACKAGE SECURITY HAVING A STATIC ELEMENT AND A DYNAMIC ELEMENT

BACKGROUND

Package security can involve a unique identifier, an anti-tampering feature, or both. Unique identifiers help prevent counterfeit packages, while anti-tampering features help prevent re-use of legitimate packages.

BRIEF DESCRIPTION OF THE DRAWINGS

For a detailed description of exemplary embodiments of the invention, reference will now be made to the accompanying drawings in which:

FIG. 3A illustrates an luminescent tile pattern in accordance with embodiments;

FIG. 3B illustrates another luminescent tile pattern in accordance with embodiments;

FIG. 4 illustrates a rear electrode conductor pattern in accordance with embodiments;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
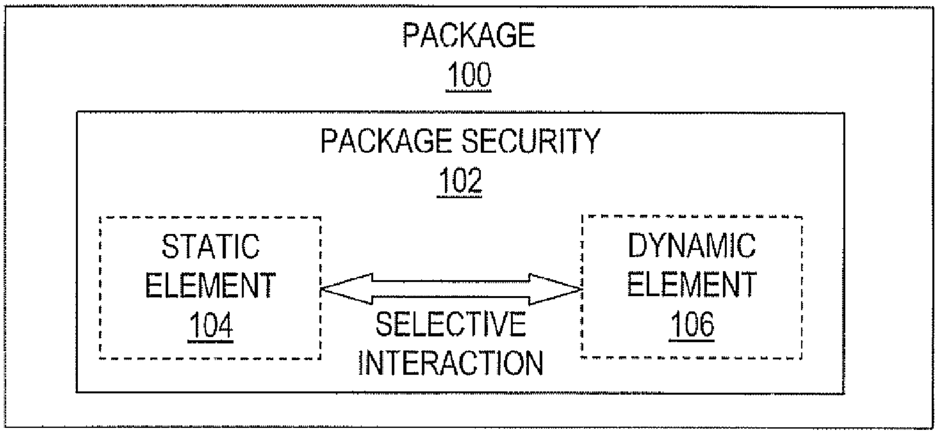
FIG. 1 illustrates a package in accordance with embodiments.

FIG. 1 illustrates a package 100 in accordance with embodiments. As shown in FIG. 1, the package 100 comprises a package security feature 102 having a static element 104 and a dynamic element 106. As used herein, a "static element" refers to an element that does not change while on a package. A static element can be removed from a package or a new static element can cover an old static element, but each static element does not change. Static printed features are examples of static elements. As used herein, a "dynamic element" refers to an element that is active or selectively active while on a package. Luminescent or light-emitting features are examples of dynamic elements. In at least some embodiments, the static element 104 provides identifiers for the package 100 and the dynamic element 106 provides anti-tampering for the package 100. The identifiers can identify information such as a particular package, a manufacturer, a vendor, an origin, a destination, a product, a lot number, or other information. The identifiers may be encrypted or otherwise unobvious.

In at least some embodiments, the dynamic element 106 selectively interacts with the static element 104 to modify the identifiers. This interaction between the dynamic element 106 and the static element 104 enables identifiers and anti-tampering for the package 100 to be combined.

In at least some embodiments, the static element 104 and the dynamic element 106 are manufactured separately and are later combined on the package 100. As an example, the static element 104 may comprise bar codes, variable text, copy-detection patterns, watermarks, color tiles, or a combination thereof. As an example, the dynamic element 106 comprises some or all of an luminescent feature or another chemically or electrically-activated feature. The dynamic element 106 can be activated periodically or as needed to authenticate the package 100. For example, authentication can be performed by a manufacturer, distributor, vendor or customer. If the dynamic element 106 is not operable (or the static element 104 is incorrect), authentication of the package 100 fails. If the static element is 104 is correct and the dynamic element 106 is operable and correct, authentication is successful. In some embodiments, authentication involves user interaction (e.g., pressing a pre-determined location to complete a circuit or otherwise completing a circuit) with the package 100. In some embodiments, authentication involves transmitting information (e.g., text, scans, or photos) resulting from the static element 104 and the dynamic element 106 to an authentication service. As an example, the authentication can be performed for tracking the package 100, recalling the package 100, buying/selling the package 100 or other functions.

Figure 2:
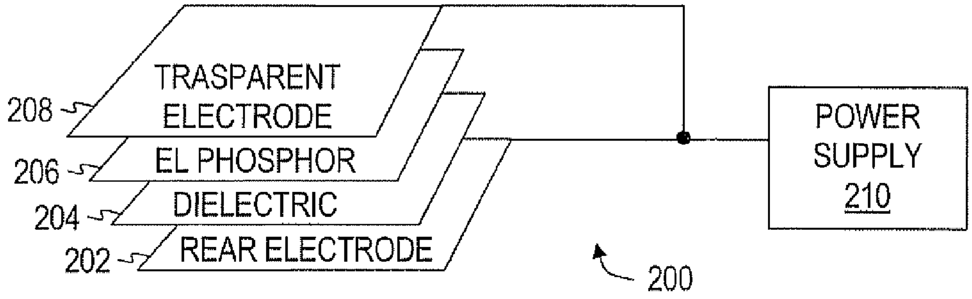
FIG. 2 illustrates an luminescent feature in accordance with embodiments.

FIG. 2 illustrates a luminescent feature 200 in accordance with embodiments. As shown in FIG. 2, the luminescent feature 200 comprises a rear electrode layer 202, a dielectric layer 204, a phosphor layer 206, and a transparent electrode layer 208. The rear electrode layer 202 and the transparent electrode layer 208 are connected to a power supply 210 which may be an AC power source. In alternative embodiments, a DC-powered luminescent feature could be implemented. In such case, the power source 210 may comprise a battery.

In at least some embodiments, the dielectric layer 204, the phosphor layer 206 and the transparent electrode layer 208 correspond to the static element 104 and the rear electrode layer 202 corresponds to the dynamic element 106 discussed for FIG. 1. In such case, the dielectric layer 204, the phosphor layer 206 and the transparent electrode layer 208 can be manufactured together and can be later combined with the rear electrode layer 202 on a package.

FIG. 3A illustrates an luminescent tile pattern 300A in accordance with embodiments. As shown in FIG. 3A, the luminescent tile pattern 300A comprises a 10×10 matrix in which four colors (C1-C4) are distributed. Although the luminescent tile pattern 300A shows the colors are distributed according to a pre-determined pattern, a random distribution could alternatively be used. In at least some embodiments, the luminescent tile pattern 300A is achieved by color printing of dye-based cyan, magenta and yellow inks, or their combination, on top of an luminescent feature. For example, the luminescent tile pattern 300A could be printed on top of a transparent electrode layer 208.

FIG. 3B illustrates another luminescent tile pattern 300B in accordance with embodiments. As shown in FIG. 3B, the luminescent tile pattern 300A comprises a 10×8 matrix in which four colors (C1-C4) are distributed. The luminescent tile pattern 300B shows the colors are distributed according to a simplified pre-determined pattern. In at least some embodiments, the luminescent tile pattern 300B is achieved by color printing of dye-based cyan, magenta and yellow inks, or their combination, on top of an luminescent feature (e.g., on top of a transparent electrode layer 208).

The embodiments of FIGS. 3A and 3B are illustrative only and are not limiting. For example, while four colors are presented in the patterns of FIGS. 3A and 3B, other patterns may have fewer colors or more colors. Also, the size of patterns may be decreased or increased. The pattern size and the amount of colors used affects the amount of information that can be represented by the pattern. As an example, a 6-color 20×20 pattern can represent up to 200 alphanumeric characters. Regardless of the size and color scheme of a pattern, package identifiers can be based on the pattern. The identifiers can identify information such as a particular package, a manufacturer, a vendor, an origin, a destination, a product, a lot number, or other information. The identifiers can be inherent in the pattern or can be revealed using an appropriate rear electrode conductor pattern. In some embodiments, the identifiers are encrypted or are otherwise unobvious.

FIG. 4 illustrates a rear electrode conductor pattern 400 in accordance with embodiments. As shown in FIG. 4, the rear electrode conductor pattern 400 comprises a 10×10 matrix in which areas represented with an "X" are not conductive. The non-conductive areas can be "punched out" or otherwise prevented from conducting electricity. In FIG. 4, the rear electrode conductor pattern 400 would prevent illumination of approximately 60% of a 10×10 luminescent tile pattern (e.g., the luminescent tile pattern 300A).

The embodiment of FIG. 4 is illustrative only and is not limiting. In other words, different rear electrode conductor patterns are possible. Regardless of the rear electrode conductor pattern, package identifiers can be based on the combination of a luminescent tile pattern (pre-determined or random) with a rear electrode conductor pattern. Even if a luminescent tile pattern is sufficient to distinguish authentic packages from non-authentic packages, combining the luminescent tile pattern with an appropriate rear electrode conductor pattern enables identifiers and anti-tampering to be combined. If desired, a rear electrode conductor pattern can be used to modify an identifier provided by the luminescent tile pattern.

Figures 5, 6:
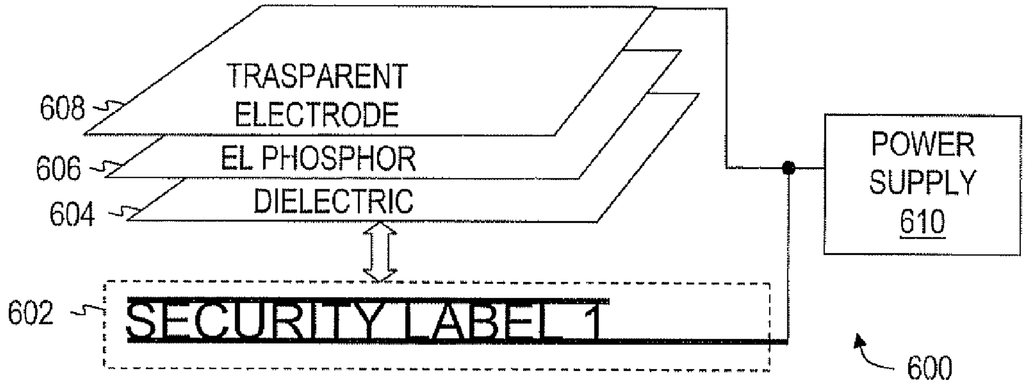
FIG. 5 illustrates a combination of the luminescent tile pattern of FIG. 3A with the rear electrode conductor pattern of FIG. 4 in accordance with embodiments.
FIG. 6 illustrates another luminescent feature in accordance with embodiments.

FIG. 5 illustrates a combination 500 of the luminescent tile pattern 300A of FIG. 3A with the rear electrode conductor pattern 400 of FIG. 4 in accordance with embodiments. In FIG. 5, the combination 500 shows the non-conductive areas of the rear electrode conductor pattern 400 as being marked with an "X" (i.e., the corresponding luminescent tiles will not illuminate). The combination 500 represents a luminescent tile pattern that is modified from the original pattern of the luminescent tile pattern 300A based on the rear electrode conductor pattern 400. If C1 represents binary 00, C2 represents binary 01, C3 represents binary 10 and C4 represents binary 11, then the pattern of the combination 500 represents 86 bits of data (00000100011110 1100010000001011111011000100010110101100000000111 1111101011000101 00111111) in a 10×10 matrix. The combination 500 enables package identifiers and anti-tampering to be combined. As an example, if the combination 500 does not illuminate, a corresponding package can be rejected even if the luminescent tile pattern 300A is correct (i.e., the package is assumed to be either counterfeit or tampered with). If the combination 500 does illuminate, a corresponding package can be rejected if the illuminated pattern is incorrect (i.e., the package is assumed to be counterfeit due to an incorrect luminescent tile pattern or an incorrect rear electrode conductor pattern). The embodiment of FIG. 5 is illustrative only and is not limiting. In other words, different combinations of luminescent tile patterns and rear electrode conductor patterns are possible.

FIG. 6 illustrates another luminescent feature 600 in accordance with embodiments. As shown in FIG. 6, the luminescent feature 600 comprises a rear electrode layer 602, a dielectric layer 604, a phosphor layer 606, and a transparent electrode layer 608. The rear electrode layer 602 and the transparent electrode layer 608 are connected to a power supply 610 which may be an AC source or DC power source. In alternative embodiments, a DC-powered luminescent feature could be implemented. In such case, the power source 610 may comprise a battery.

In at least some embodiments, the rear electrode layer 602 is provided using a printing technology (e.g., inkjet printing). For example, an ink-receptive coating can be pre-applied to a substrate before printing. Then a suitably conductive inkjet ink (e.g., silver nanoparticle ink) is used to print variable data patterns. After printing, the ink's conductivity can be enhanced by curing the ink at high temperature (e.g., 150 degrees Celsius for 10 minutes). The dielectric layer 604, the phosphor layer 606, and the transparent electrode layer 608 can be applied together (e.g., as an adhesive label) over the rear electrode layer 602.

In at least some embodiments, the dielectric layer 604, the phosphor layer 606 and the transparent electrode layer 608 correspond to the static element 104 and the rear electrode layer 602 corresponds to the dynamic element 106 discussed for FIG. 1. In such case, the dielectric layer 604, the phosphor layer 606 and the transparent electrode layer 608 can be manufactured together and can be later combined with the rear electrode layer 602 on a package.

Figure 7:
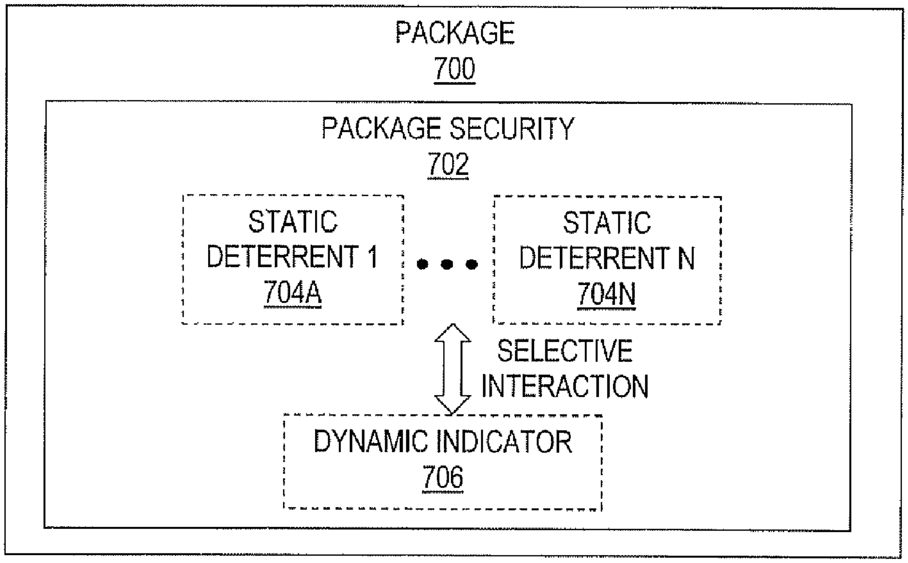
FIG. 7 illustrates another package in accordance with embodiments.

FIG. 7 illustrates another package 700 in accordance with embodiments. As shown in FIG. 7, the package 700 comprises a package security feature 702 having a plurality of static deterrents 704A-704N and a dynamic indicator 706. In at least some embodiments, at least one of the static deterrents 704A-704N provides packager identifiers and the dynamic indicator 706 provides anti-tampering for the package 700. In at least some embodiments, the dynamic indicator 706 selectively interacts with at least one of the static deterrents 704A-706N to modify the identifiers. This interaction between the dynamic indicator 706 and at least one of the static deterrents 704A-704N enables the package identifiers and anti-tampering to be combined.

In at least some embodiments, the static deterrents 704A-704N and the dynamic indicator 706 are manufactured separately and are later combined on the package 700. As an example, the static deterrents 704A-704N may comprise bar codes, variable text, copy-detection patterns, watermarks, color tiles, or a combination thereof. As an example, the dynamic indicator 706 comprises some or all of an electroluminescent feature or another chemically or electrically-activated feature. The dynamic indicator 706 can be activated periodically or as needed to authenticate the package 700. If the dynamic indicator 706 is not operable or the static deterrents 704A-704N are incorrect, authentication of the package 700 fails. If the static deterrents 704A-704N are correct and the dynamic indicator 706 is operable and correct, authentication is successful. In some embodiments, authentication involves user interaction (e.g., pressing a pre-determined location to complete a circuit or otherwise completing a circuit) with the package 700. In some embodiments, authentication involves transmitting information (e.g., text, scans, or photos) resulting from the static deterrents 704A-704N and the dynamic indicator 706 to an authentication service. As an example, the authentication can be performed for tracking the package 700, recalling the package 700, buying/selling the package 700 or other functions.

Figure 8:
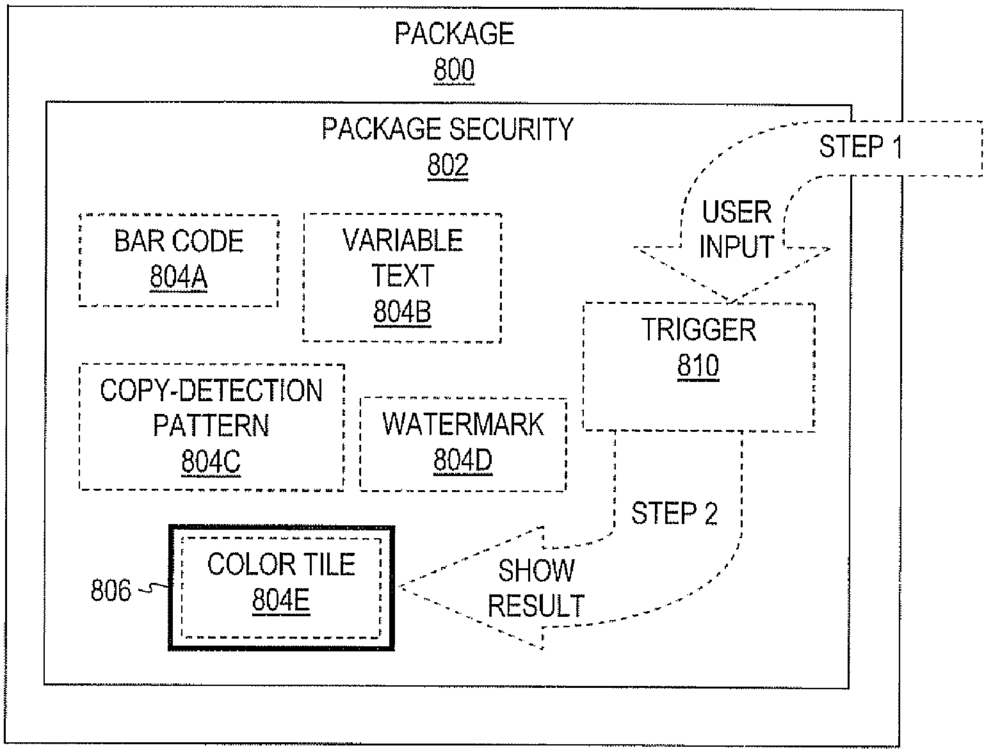
FIG. 8 illustrates a package in accordance with the embodiment of FIG. 7.

FIG. 8 illustrates a package 800 in accordance with the embodiment of FIG. 7. As shown in FIG. 8, the package 800 comprises a package security feature 802 having a bar code 804A, variable text 804B, copy-pattern detection 804C, a watermark 804D, and a color tile 804E. The package security feature 802 further comprises a dynamic indicator 806. In at least some embodiments, at least one of the bar code 804A, the variable text 804B, the copy-pattern detection 804C, the watermark 804D, and the color tile 804E provide package identifiers while the dynamic indicator 806 provides anti-tampering for the package 800.

In at least some embodiments, the dynamic indicator 806 is manufactured separately from the bar code 804A, the variable text 804B, the copy-pattern detection 804C, the watermark 804D, and the color tile 804E and is later combined on the package 800. As an example, the dynamic indicator 806 comprises some or all of an electroluminescent feature or another chemically or electrically-activated feature. The dynamic indicator 806 can be activated periodically or as needed to authenticate the package 800. For example, authentication can be performed by a manufacturer, distributor, vendor or customer. If the dynamic indicator 806 is not operable or the bar code 804A, the variable text 804B, the copy-pattern detection 804C, the watermark 804D, or the color tile 804E are incorrect, authentication of the package 800 fails. If the bar code 804A, the variable text 804B, the copy-pattern detection 804C, the watermark 804D, and the color tile 804E are correct and the dynamic indicator 806 is operable and correct, authentication is successful.

In some embodiments, authentication involves user interaction with a trigger 810. As an example, the trigger 810 may comprise a switch or a pre-determined location on the package 800 that completes a circuit when pressed. The trigger 810 may alternatively comprise connecting a plug to complete a circuit. In response to user interaction with the trigger 810, the dynamic indicator 806 outlines the color tile 804E. This interaction between the dynamic indicator 806 and the color tile 804E enables package identifiers anti-tampering to be combined. In some embodiments, authentication involves transmitting information (e.g., text, scans, or photos) resulting from the dynamic indicator 806 and the bar code 804A, the variable text 804B, the copy-pattern detection 804C, the watermark 804D, or the color tile 804E to an authentication service. As an example, the authentication can be performed for tracking the package 800, recalling the package 800, buying/selling the package 800 or other functions.

The embodiment of FIG. 8 is illustrative only and is not limiting. For example, more or less package identifiers could be implemented. Also, the dynamic indicator 806 could be a single line, multiple lines, an arrow, a circle, or other shapes used to provide an indicator. Additionally or alternatively, the dynamic indicator 806 may comprise alphanumeric text such as the luminescent feature described for FIG. 6. The dynamic indicator 806 could signal one identifier (as in FIG. 8), multiple identifiers, portions of an identifier, or portions of multiple identifiers on the package 800.

Figure 9:
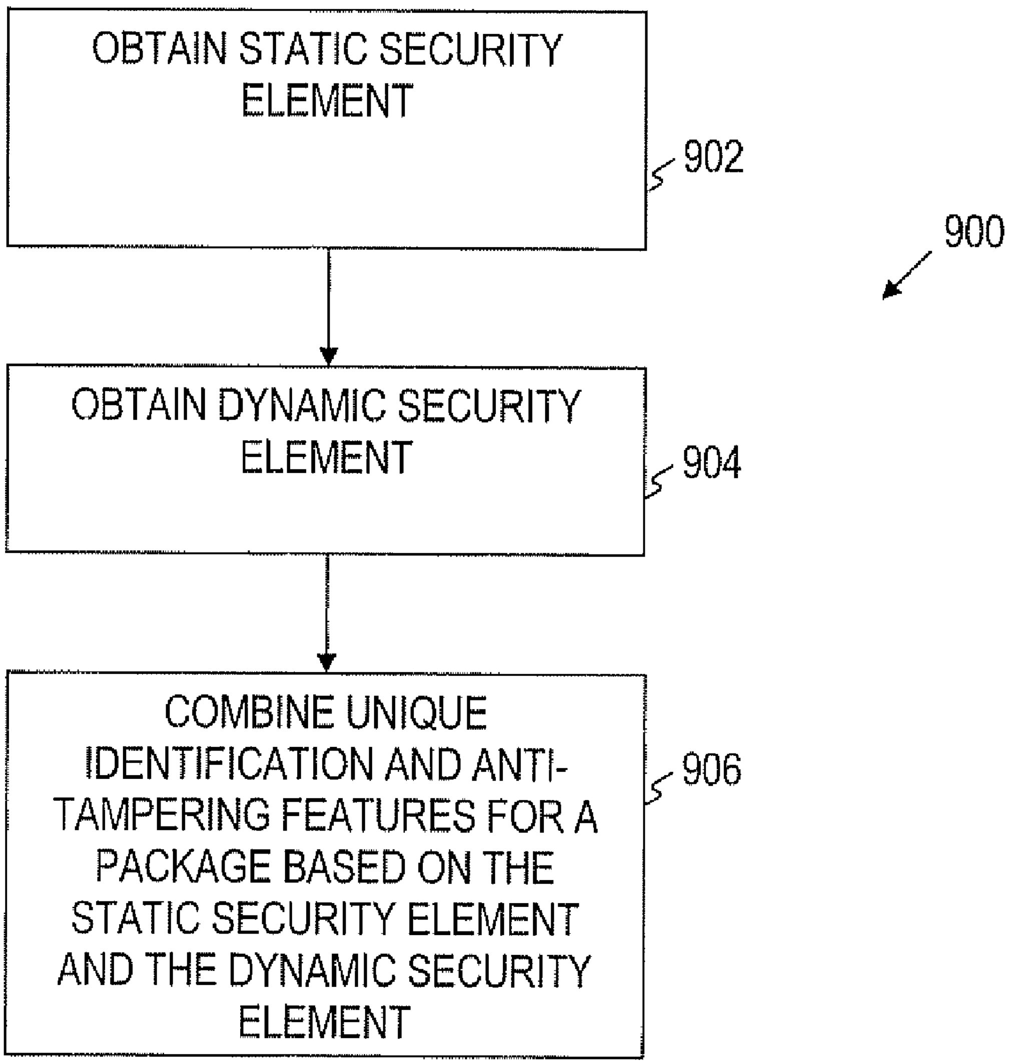
FIG. 9 illustrates a package security method in accordance with embodiments.

FIG. 9 illustrates a package security method 900 in accordance with embodiments. As shown in FIG. 9, the method 900 comprises obtaining a static security element (block 902). As an example, the static security element may comprise bar codes, variable text, copy-detection patterns, watermarks, color tiles, or a combination thereof. The method 900 further comprises obtaining a dynamic security element 904. As an example, the dynamic security element comprises some or all of an electroluminescent feature or another chemically or electrically-activated feature. In at least some embodiments, the static security element and the dynamic security element are manufactured separately. Finally, the method 900 comprises combining package identifiers and anti-tampering based on the static security element and the dynamic security element (block 906). For example, the dynamic security element may interact with the static security element to modify an identifier, to mark part of an identifier or to mark at least one of a plurality of identifiers.

Figure 10:
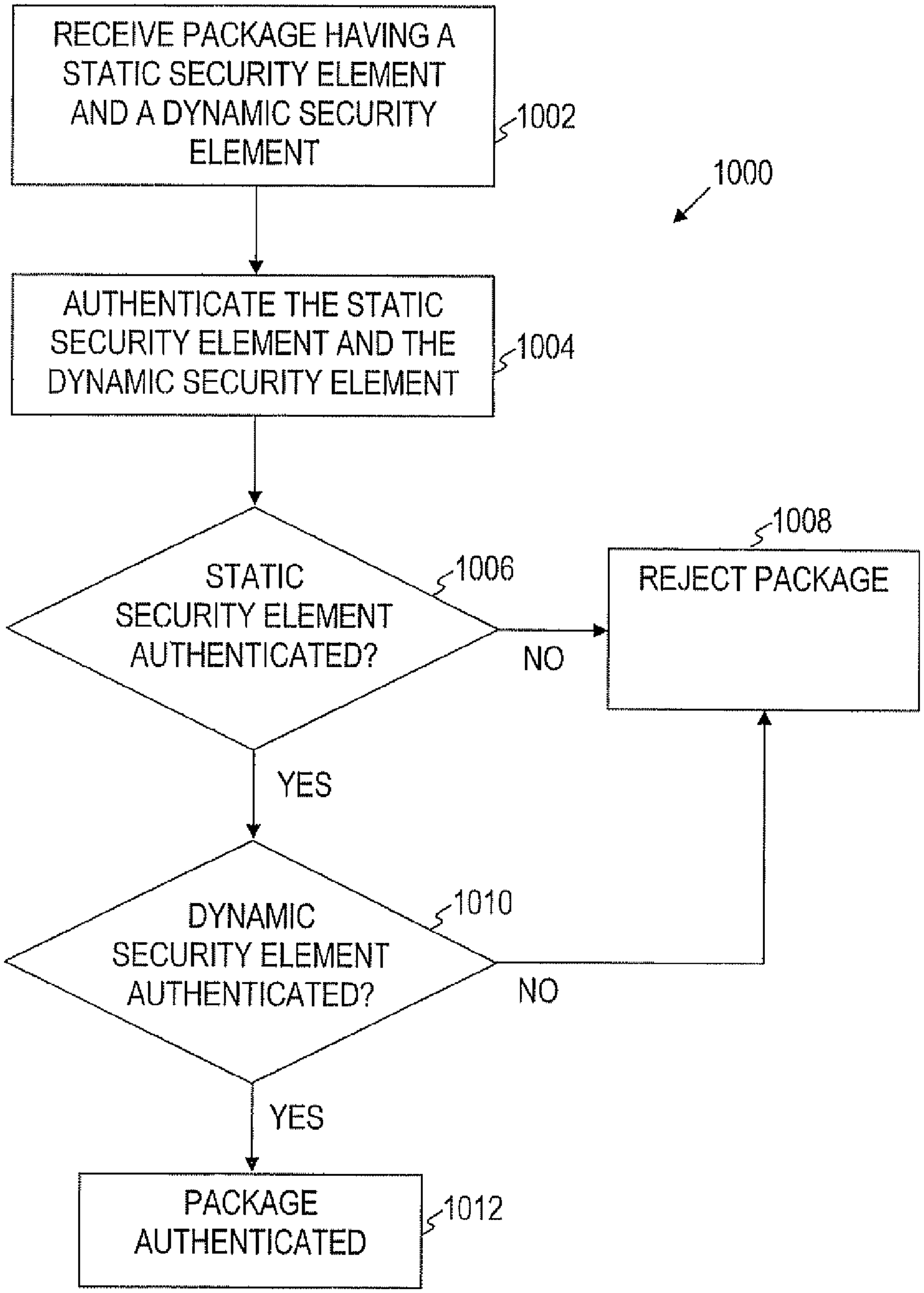
FIG. 10 illustrates a package authentication method in accordance with embodiments.

FIG. 10 illustrates a package authentication method 1000 in accordance with embodiments. As shown in FIG. 10, the method 1000 comprises receiving a package having a static security element and a dynamic security element (block 1002). The static security element may comprise bar codes, variable text, copy-detection patterns, watermarks, color tiles, or a combination thereof. The dynamic security element may comprise some or all of an electroluminescent feature or another chemically or electrically-activated feature. In at least some embodiments, the dynamic security element interacts with the static security element to modify an identifier, to mark part of an identifier or to mark at least one of a plurality of identifiers.

Continuing with the method 1000, the static security element and the dynamic security element are authenticated (block 1004). If the static security element is not authenticated (determination block 1006) or the dynamic security element is not authenticated (determination block 1010), the package is rejected (block 1008) or is otherwise handled as having failed authentication. If the static security element is authenticated (determination block 1006) and the dynamic security element is authenticated (determination block 1010), the package is authenticated (block 1012).

Figure 11:
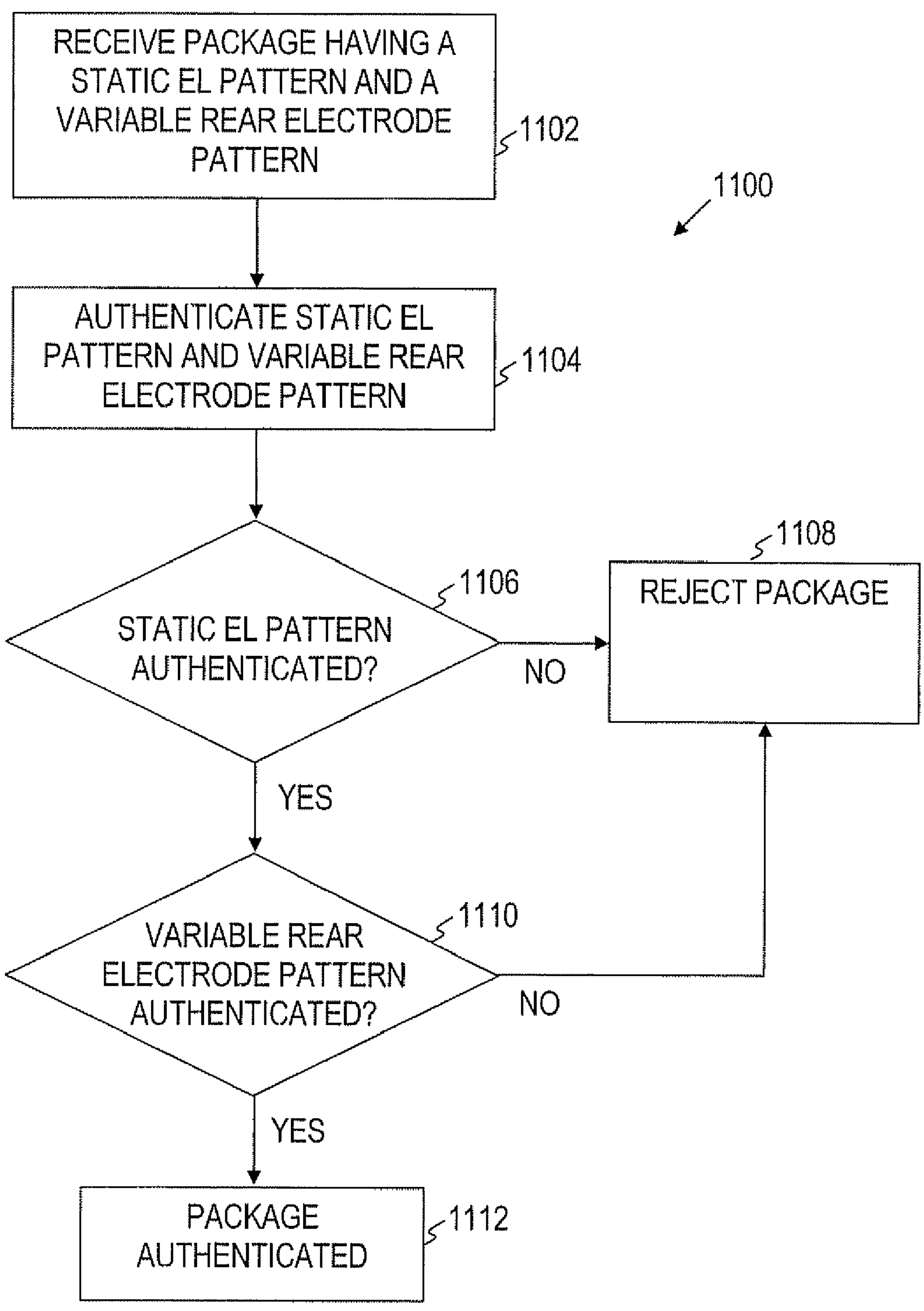
FIG. 11 illustrates another package authentication method in accordance with embodiments.

FIG. 11 illustrates another package authentication method 1100 in accordance with embodiments. As shown in FIG. 11, the method 1100 comprises receiving a package having a static luminescent pattern and a variable rear electrode pattern (block 1102). The size, the colors, and the pattern of the static luminescent pattern can vary such as the embodiments as previously described. Also, the rear electrode conductor pattern can vary such as the embodiments as previously described. In at least some embodiments, the variable rear electrode pattern interacts with the static luminescent pattern to create an identifier or to modify an identifier provided by the static luminescent pattern.

Continuing with the method 1100, the static luminescent pattern and the variable rear electrode pattern are authenticated (block 1104). If the static luminescent pattern is not authenticated (determination block 1106) or the variable rear electrode pattern is not authenticated (determination block 1110), the package is rejected (block 1108) or is otherwise handled as having failed authentication. If the static luminescent pattern is authenticated (determination block 1106) and the variable rear electrode pattern is authenticated (determination block 1110), the package is authenticated (block 1112).

Figure 12:
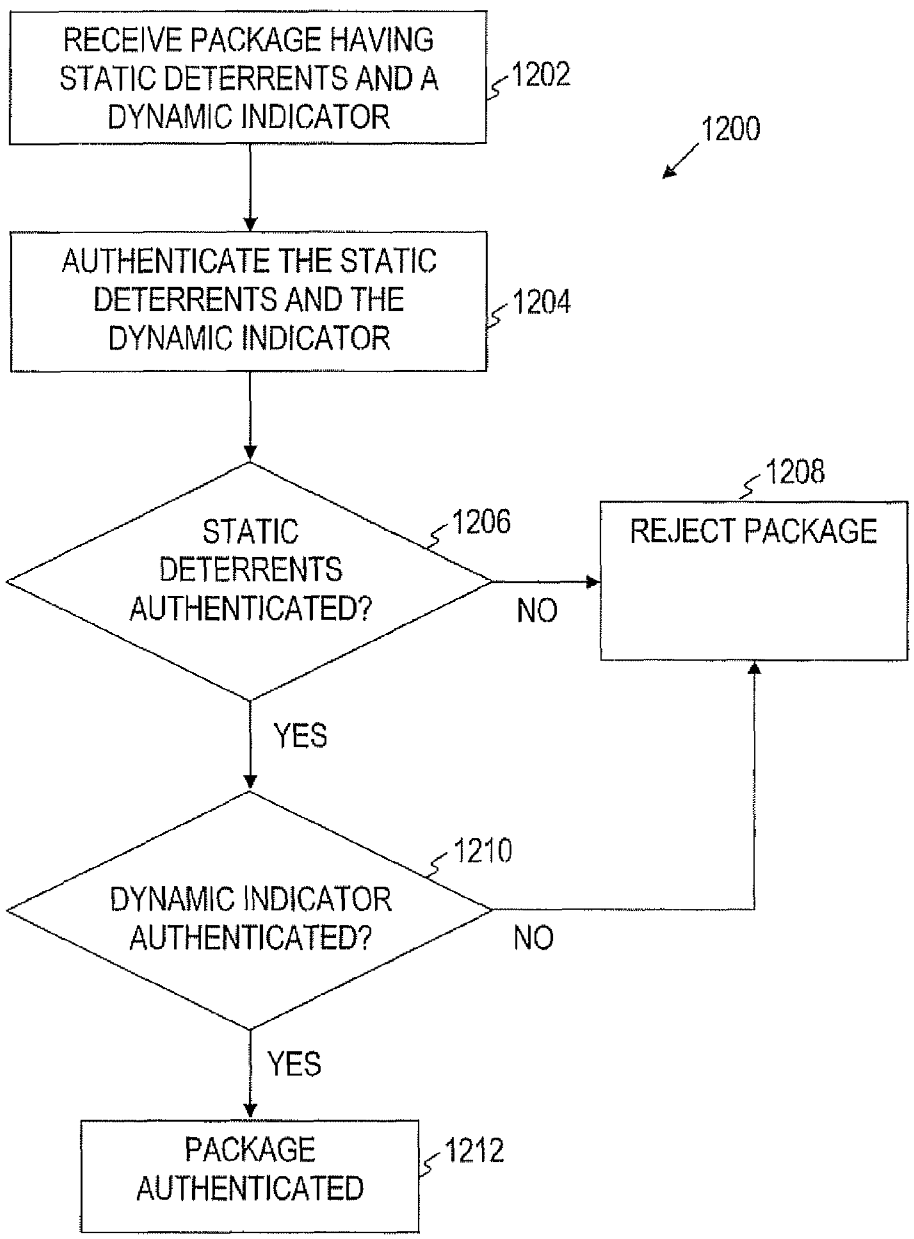
FIG. 12 illustrates yet another package authentication method in accordance with embodiments.

FIG. 12 illustrates yet another package authentication method 1200 in accordance with embodiments. As shown in FIG. 12, the method 1200 comprises receiving a package having static deterrents and a dynamic indicator (block 1202). The static deterrents may comprise bar codes, variable text, copy-detection patterns, watermarks, color tiles, or a combination thereof. The dynamic indicator may comprise some or all of an electroluminescent feature or another chemically or electrically-activated feature. If desired, multiple luminescent features (using the same technology or different technology) could be used. In at least some embodiments, the dynamic indicator interacts with the static deterrents to modify an identifier, to mark part of an identifier or to mark at least one of a plurality of identifiers.

Continuing with the method 1200, the static deterrents and the dynamic indicator are authenticated (block 1204). If the static deterrents are not authenticated (determination block 1206) or the dynamic indicator is not authenticated (determination block 1210), the package is rejected (block 1208) or is otherwise handled as having failed authentication. If the static deterrents are authenticated (determination block 1206) and the dynamic indicator is authenticated (determination block 1210), the package is authenticated (block 1212).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A package security feature for attachment to a package, comprising:
- a static element that provides at least one printed identifier for the package; and
- a dynamic luminescent element, separate from and underneath the static element, that couples to a power supply via a triggering circuit, wherein the dynamic luminescent element is configured to illuminate upon receiving power from the power supply when the triggering circuit is closed,
- wherein successful authentication of the package is based on the at least one printed identifier being correct and the dynamic luminescent element being operational when the triggering circuit is closed and interacting with the at least one printed identifier in a predetermined way.

2. The package security feature of claim 1 wherein the static element comprises at least one element selected from the group consisting of a bar code, variable text, a copy-detection pattern, a watermark, and a color tile.

3. The package security feature of claim 1 wherein the static element comprises a luminescent tile pattern.

4. The package security feature of claim 1 wherein the static element comprises a dielectric layer, a phosphor layer, and a transparent electrode layer combined as an adhesive label.

5. The package security feature of claim 1 wherein the dynamic luminescent element comprises a rear electrode conductor pattern.

6. The package security feature of claim 5 wherein the rear electrode conductor pattern comprises printed alphanumeric characters.

7. The package security feature of claim 5 wherein the rear electrode conductor pattern comprises non-conductive areas that modify a luminescent tile pattern.

8. The package security feature of claim 1 wherein the static element and the dynamic luminescent element are manufactured separately and are later combined on the package.

9. The package security feature of claim 1 further comprising a trigger switch that enables a user to manually control when the triggering circuit is closed.

10. The package security feature of claim 1 wherein the power supply comprises a battery.

11. The package security feature of claim 1 wherein the dynamic luminescent element is configured to modify the at least one printed identifier provided by the static element.

12. The package security feature of claim 1 wherein the at least one printed identifier comprises multiple printed identifiers and wherein the dynamic luminescent element is configured to mark at least one of the multiple printed identifiers.

13. The package security feature of claim 1 wherein successful authentication of a package related to the package security feature is based on the static element displaying a correct printed identifier and the dynamic luminescent element modifying the correct printed identifier.

14. A method for package security, comprising:
- attaching an adhesive light-emitting label to a package; and
- attaching an adhesive static label over the adhesive light-emitting label, the adhesive static label displays at least one printed identifier for the package;
- wherein the adhesive light-emitting label is configured to interact with the at least one printed identifier of the adhesive static label when a triggering circuit that couples a power supply to the adhesive light-emitting label is closed.

15. The method of claim 14 wherein providing the adhesive static label comprises providing at least one printed element as the at least one printed identifier selected from the group consisting of a bar code, variable text, a copy-detection pattern, a watermark, and a color tile.

16. The method of claim 14 wherein providing the adhesive static label comprises providing a luminescent tile pattern without a rear electrode and wherein providing a adhesive l light-emitting label comprises preparing a variable rear electrode conductor pattern.

17. The method of claim 14 wherein providing the adhesive static label comprises manufaturing the adhesive label having a dielectric layer, a phosphor layer and a clear electrode layer and wherein providing the adhesive light-emitting label comprises printing alphanumeric characters with conductive ink for use as a rear electrode conductor.

18. The method of claim 14, wherein the at least one printed identifier comprises multiple printed identifiers, and wherein the method further comprises marking at least one of the multiple printed identifiers of the adhesive static label with the adhesive light-emitting label.

19. The method of claim 14 further comprising modifying the at least one printed identifier of the adhesive static label with the adhesive light-emitting label.

20. A method for package authenticating, comprising:

receiving a package having a static security element positioned over a dynamic luminescent security element, the static security element displaying at least one printed identifier and the dynamic luminescent security element being selectively activated using a triggering circuit that couples a power supply to the dynamic luminescent security element; and authenticating the package based on the at least one printed identifier being correct and based on the dynamic luminescent security element interacting with the at least one printed identifier in a predetermined way.

21. The method of claim 20 wherein said interacting comprises modifying that at least one printed identifier.

22. The method of claim 20 wherein said interacting comprises marking one of multiple printed identifiers.

* * * * *

UNITED STATES PATENT AND TRADEMARK OFFICE

CERTIFICATE OF CORRECTION

PATENT NO. : 7,950,584 B2
APPLICATION NO. : 11/554945
DATED : May 31, 2011
INVENTOR(S) : Steven J. Simske et al.

It is certified that error appears in the above-identified patent and that said Letters Patent is hereby corrected as shown below:

In column 8, line 54, in Claim 16, after “adhesive” delete “1”.

In column 8, line 58, in Claim 17, delete “manufaturing” and insert -- manufacturing --, therefor.

Signed and Sealed this
Twentieth Day of December, 2011

David J. Kappos
*Director of the United States Patent and Trademark Office*